United States Patent
Hasegawa et al.

(10) Patent No.: US 7,916,503 B2
(45) Date of Patent: Mar. 29, 2011

(54) DC-DC CONVERTER, POWER SUPPLY VOLTAGE SUPPLYING METHOD, AND POWER SUPPLY VOLTAGE SUPPLYING SYSTEM

(75) Inventors: Morihito Hasegawa, Kasugai (JP); Takashi Matsumoto, Kasugai (JP); Ryuta Nagai, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 395 days.

(21) Appl. No.: 12/055,437

(22) Filed: Mar. 26, 2008

(65) Prior Publication Data

US 2008/0238394 A1  Oct. 2, 2008

(30) Foreign Application Priority Data

Mar. 29, 2007  (JP) .................................. 2007-088576

(51) Int. Cl.
*H02M 3/335* (2006.01)

(52) U.S. Cl. .......................................... 363/16; 363/97

(58) Field of Classification Search .......... 323/282–288, 323/222, 207, 235, 315; 363/16–20, 21.03, 363/21.13, 21.11, 97, 91, 98
See application file for complete search history.

(56) References Cited

U.S. PATENT DOCUMENTS

| | | | |
|---|---|---|---|
| 5,680,034 A * | 10/1997 | Redl | 363/21.03 |
| 5,966,003 A | 10/1999 | Takimoto et al. | |
| 6,778,417 B2 * | 8/2004 | Itakura et al. | 363/97 |
| 7,009,371 B2 | 3/2006 | Nakata | |
| 7,129,679 B2 * | 10/2006 | Inaba et al. | 323/222 |

FOREIGN PATENT DOCUMENTS

| | | |
|---|---|---|
| JP | 10-323026 A | 12/1998 |
| JP | 11-75365 A | 3/1999 |
| JP | 2005-51956 A | 2/2005 |
| JP | 2006-311729 A | 11/2006 |

* cited by examiner

*Primary Examiner* — Rajnikant B Patel

(74) *Attorney, Agent, or Firm* — Arent Fox LLP

(57) ABSTRACT

According to one aspect of the invention, a DC-DC converter including a soft-start function of a soft start in response to a soft-start signal, comprises: a detection circuit that detects whether the soft-start signal is active at an end of a soft-start operation; and an output voltage control circuit that controls an output voltage based on detection result of the detection circuit.

20 Claims, 11 Drawing Sheets

US 7,916,503 B2

DC-DC CONVERTER, POWER SUPPLY VOLTAGE SUPPLYING METHOD, AND POWER SUPPLY VOLTAGE SUPPLYING SYSTEM

CROSS-REFERENCE TO RELATED APPLICATION

This application is based on and claims the benefit of priority from Japanese Patent Application No. 2007-088576 filed on Mar. 29, 2007, the entire contents of which are incorporated herein by reference.

BACKGROUND OF THE INVENTION

1. Field of the Invention

The application relates to a DC-DC converter.

2. Description of Related Art

FIG. 1 shows a soft-start DC-DC converter 100 of Japanese Laid-open Patent Publication No. 10-323026. A node N101 is connected to the inverting input terminal of an error amplifier ERA101 which is provided in a DC-DC converter control circuit 102. A reference voltage e101 is supplied to a first non-inverting input terminal of the error amplifier ERA101 and a capacitor CS is connected to a second non-inverting input terminal of the error amplifier ERA101. An external operation control signal CNT is input to a charging/discharging control circuit 130.

When the DC-DC converter 100 is activated, the operation control signal CNT is changed from a low level to a high level. Switches SW101 of the charging/discharging control circuit 130 are closed and SW102 of the charging/discharging control circuit 130 is opened, in response to the high-level of the operation control signal CNT. As a result, the capacitor CS is charged by a current i101 flowing through a constant current circuit CC and an output voltage control signal VCS outputted from the capacitor CS increases gradually from 0 V. At this time, the output voltage control signal VCS is a lower one of voltages that are input to the non-inverting input terminals of the error amplifier ERA 101, and hence an output voltage Vout is controlled by the output voltage control signal VCS. Therefore, the output voltage Vout increases gradually as the charging of the capacitor CS proceeds. In this manner, a soft-start operation is performed according to the output voltage control signal VCS.

FIG. 2 shows a chattering elimination circuit 200 using a Schmitt trigger circuit. The chattering elimination circuit 200 includes a low-pass filter 201 and a Schmitt trigger circuit 202. The low-pass filter 201 includes a resistor 203 and a capacitor 204. One end of the resistor 203 is connected to an input terminal Tin and the other end of the resistor 203 is connected to the capacitor 204 and the Schmitt trigger circuit 202. The other end of the capacitor 204 is grounded. The output terminal of the Schmitt trigger circuit 202 is connected to an output terminal Tout. The Schmitt trigger circuit 202 is a circuit which has two threshold levels (an upper limit value and a lower limit value) and whose status is changed depending on either an input voltage being larger than the threshold level or the input voltage being smaller the threshold level. The difference between the upper limit value and the lower limit value is called a hysteresis voltage, and the chattering elimination ability increases as the hysteresis voltage becomes higher.

The chattering elimination circuit 200 is used for eliminating chattering of the operation control signal CNT for the DC-DC converter 100. The operation control signal CNT is input to the input terminal Tin. Waveform distortion of the operation control signal CNT is smoothed out by the low-pass filter 201, and the operation control signal CNT is input to the Schmitt trigger circuit 202. The Schmitt trigger circuit 202 inverts the output signal when the input voltage crosses the threshold levels. The output terminal Tout outputs the operation control signal CNT with eliminated chattering, and the operation control signal is input to the DC-DC converter control circuit 102.

Related techniques are disclosed in Japanese Laid-open Patent Publication No. 11-75365, Japanese Laid-open Patent Publication No. 2005-51956, and Japanese Laid-open Patent Publication No. 2006-311729, for example.

SUMMARY

According to one aspect of the invention, a DC-DC converter including a soft-start function of a soft start in response to a soft-start signal, comprises: a detection circuit that detects whether the soft-start signal is active at an end of a soft-start operation; and an output voltage control circuit that controls an output voltage based on detection result of the detection circuit.

DESCRIPTION OF THE PREFERRED EMBODIMENTS

Figure 1:
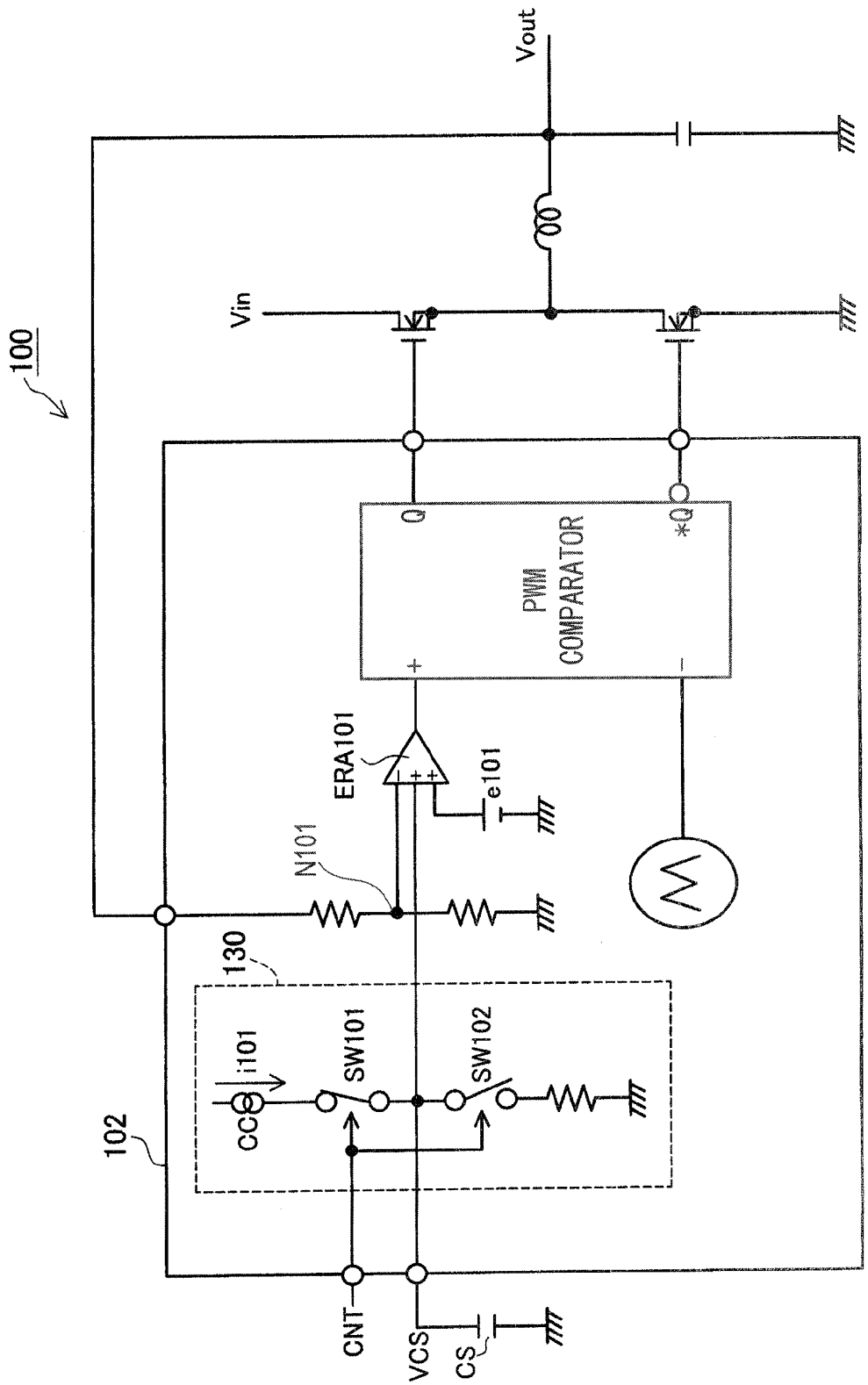
FIG. 1 is a circuit diagram of a DC-DC converter.
Figure 2:
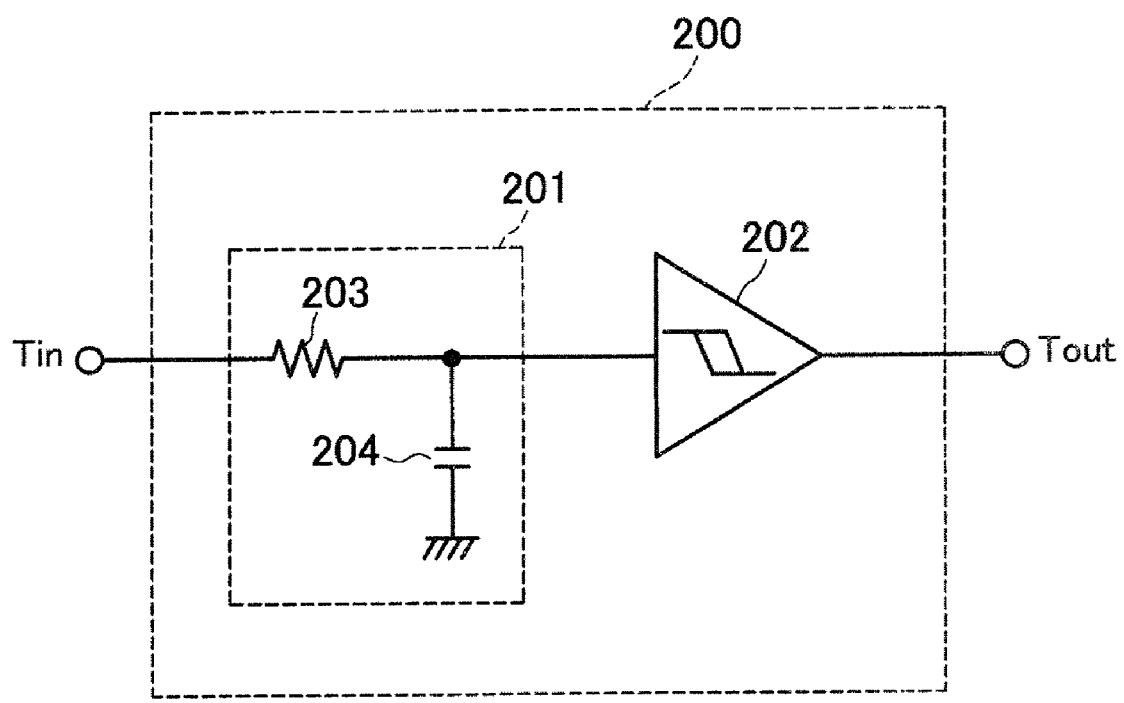
FIG. 2 is a circuit diagram of a chattering elimination circuit.

Since the operation control signal CNT is input externally, such parameters as a duration and a pulse width of chattering take various values. However, in the chattering elimination circuit 200, various circuit constants such as the hysteresis voltage of the Schmitt trigger circuit 202, the resistance of the resistor 203 of the low-pass filter 201 and the capacitance of the capacitor 204 of the low-pass filter 201 should be determined in advance so as to be most suitable for the chattering parameters. This may make the circuit designing difficult.

Figure 3:
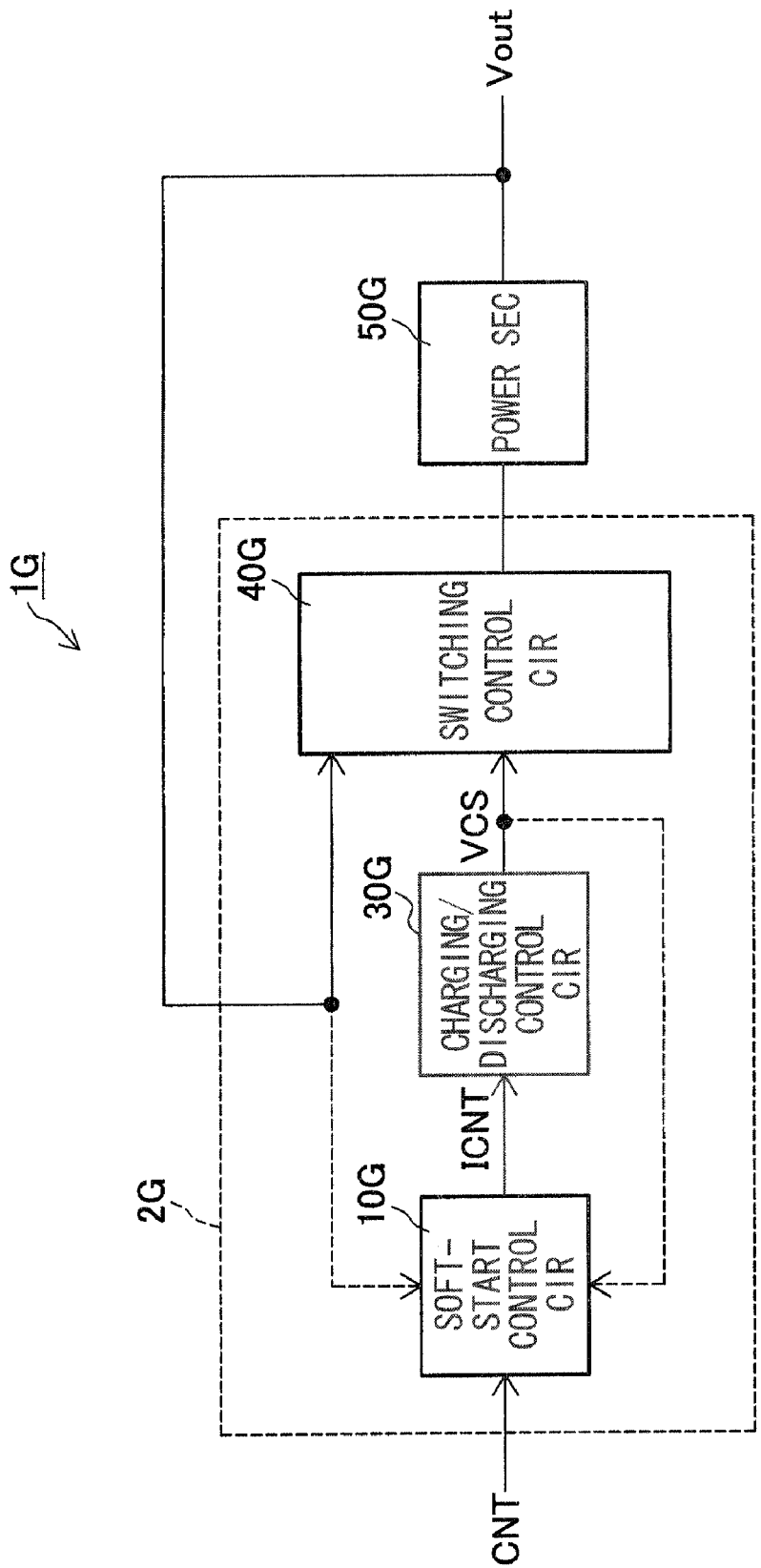
FIG. 3 shows a DC-DC converter according to a first embodiment.

FIG. 3 shows a DC-DC converter 1G according to a first embodiment. The DC-DC converter 1G includes a DC-DC converter control circuit 2G and a power section 50G. An output voltage Vout is output from the power section 50G. The DC-DC converter control circuit 2G includes a soft-start control circuit 10G, a charging/discharging control circuit 30G, and a switching control circuit 40G. An external operation control signal CNT is input to the soft-start control circuit 10G. An output voltage control signal VCS which is output from the charging/discharging control circuit 30G or the output voltage Vout, which is output from the power section 50C, is input to the soft-start control circuit 10G. An internal operation control signal ICNT, which is output from the soft-start control circuit 10G, is input to the charging/discharging control circuit 30G. The output voltage control signal VCS, which is output from the charging/discharging control circuit 30G, and the output voltage Vout are input to the switching control circuit 40G. The output terminal of the switching control circuit 40G is connected to the power section 50G.

The DC-DC converter 1G operates in the following manner. The DC-DC converter control circuit 2G starts a soft-start operation of the DC-DC converter 1G in response to a high-level of the operation control signal CNT which is an operation command. The DC-DC converter control circuit 2G stops operation of the DC-DC converter 1G in response to a low-level of the operation control signal CNT which is a stop command. In activating the DC-DC converter 1G from a stop state, the DC-DC converter control circuit 2G causes the DC-DC converter 1G to start a soft-start operation which prevents occurrence of a rush current by increasing the output voltage Vout gradually from 0 V to a predetermined setting voltage.

The soft-start operation is an operation for preventing occurrence of a rush current by increasing the output voltage Vout gradually from 0 V to a setting voltage in activating the DC-DC converter 1G. The DC-DC converter 1G starts a soft start operation in response to a soft-start signal. A detection circuit or a detecting step detects whether or not the soft-start signal is active at the end of the soft-start operation.

The soft-start control circuit 10G monitors the output voltage control signal VCS or the output voltage Vout. The soft-start control circuit 10G performs a first operation of disregarding a stop command during a period in which a soft-start operation is started, the output voltage Vout increases the setting voltage, and the soft-start operation is completed. The soft-start control circuit 10G performs a second operation of disregarding an operation command during a period in which a stop operation of the DC-DC converter 1G is started, the output voltage Vout decreases to approach 0 V, and the stop operation of the DC-DC converter 1G is completed.

The first operation is as follows. When the DC-DC converter 1G is to be activated, the operation control signal CNT changes from the low level to the high level. At this time, a chattering, which is an alternating transition between the low level and the high level that occurs multiple times in a short period of time, may occur in the operation control signal CNT. When the operation control signal CNT has made a first transition from the low level to the high level, the soft-start control circuit 10G causes a transition of the internal operation control signal ICNT from a low level to a high level. In response to the high-level of the internal operation control signal ICNT, the charging/discharging circuit 30G increases the output voltage control signal VCS gradually from 0 V. The switching control circuit 40G controls the power section 50G so that the output voltage Vout increases as the output voltage control signal VCS increases. The DC-DC converter control circuit 2G starts a soft-start operation in response to the first transition from the low level to the high level of the operation control signal CNT.

If a low-level of the operation control signal CNT due to chattering is received at any time from the start to the end of the soft-start operation, the soft-start control circuit 10G masks the low-level signal of the operation control signal CNT. Since the internal operation control signal ICNT is kept at the high level, the soft-start operation is continued. On the other hand, if a low-level signal of the operation control signal CNT is received after completion of the soft-start operation, the soft-start control circuit 10G does not mask it. Therefore, the internal operation control signal ICNT turns to the low level and the operation of the DC-DC converter 1G stops. In this manner, the first operation can prevent influence of chattering even if it occurs in the operation control signal CNT during a period from the start to the end of a soft-start operation. As described above, the DC-DC converter 1G starts a soft-start operation in response to a first-activated soft-start signal. Even if another active soft-start signal is input before the end of the soft-start operation, it is disregarded and hence the soft-start operation is continued. When the output voltage Vout is increased to the terminal voltage, the soft-start operation is finished.

A detection result indicating whether or not the soft-start signal is active is obtained at the end of the soft-start operation. The output voltage Vout is controlled on the basis of this detection result.

In this manner, influence of chattering can be prevented even if it occurs in the soft-start signal during a period from the start to the end of a soft-start operation.

The second operation is as follows. Chattering may occur when the DC-DC converter 1G is activated, more specifically, when the operation control signal CNT makes a transition from the low level to the high level. When the operation control signal CNT has made the first transition from the low level to the high level, the DC-DC converter control circuit 2G starts a soft-start operation. When the operation control signal CNT thereafter makes a transition from the high level to the low level, the DC-DC converter control circuit 2G finishes the soft-start operation and starts a stop operation of the DC-DC converter 1G. As a result, the output voltage Vout of the DC-DC converter 1G decreases.

If a high-level operation control signal CNT due to chattering is received at any time from the start to the end of the stop operation of the DC-DC converter 1G, the soft-start control circuit 10G masks the high-level operation control signal CNT. Since the internal operation control signal ICNT is kept at the low level, the DC-DC converter 1G is kept non-operational. On the other hand, if a high-level signal of the operation control signal CNT is received after completion of the stop operation of the DC-DC converter 1G, the soft-start control circuit 10G does not mask it. Therefore, the internal operation control signal ICNT turns to the high level and the DC-DC converter 1G starts a soft-start operation again. In this manner, the second operation can prevent influence of chattering even if it occurs in the operation control signal CNT during a period from the start to the end of a stop operation of the DC-DC converter 1G.

The DC-DC converter 1G starts a soft-start operation in the case where the output voltage Vout is in a prescribed range including the ground potential. When the DC-DC converter 1G is to be activated, the soft-start signal makes a transition from an inactive state to an active state. If chattering occurs at this time, the DC-DC converter 1G starts a soft-start operation in response to the first transition from the inactive state to the active state and the output voltage Vout of the DC-DC converter 1G increases. When the soft-start signal subsequently makes a transition from the active state to an inactive state, the DC-DC converter 1G finishes the soft-start operation and the output voltage Vout decreases. Even if an active soft-start signal is input after the start of a stop operation of the DC-DC converter 1G, since a detected output voltage Vout is higher than the prescribed range including the ground potential, the output voltage Vout continues to decrease and the stop operation of the DC-DC converter 1G is completed thereafter.

If the soft-start signal is activated after the stop operation of the DC-DC converter 1G is completed, a soft-start operation is started again because the output voltage Vout is in the prescribed range including the ground potential.

In this manner, influence of chattering can be prevented in a period from the start to the end of a stop operation of the DC-DC converter 1G.

The soft-start control circuit 10G has the mode in which a stop command is disregarded in a period from the start to the end of a soft-start operation of the DC-DC converter 1G or the mode in which an operation command is disregarded in a period from the start to the end of a stop operation of the DC-DC converter 1G. Therefore, DC-DC converter 1G can be prevented from being influenced by chattering irrespective of such parameters as a duration and a pulse width of the chattering. It is not necessary that the DC-DC converter 1G includes a chattering elimination circuit whose various circuit constants are determined in advance so as to be most suitable for various parameters of chattering. Therefore, the first embodiment makes it possible to simplify the circuit designing.

Figure 4:
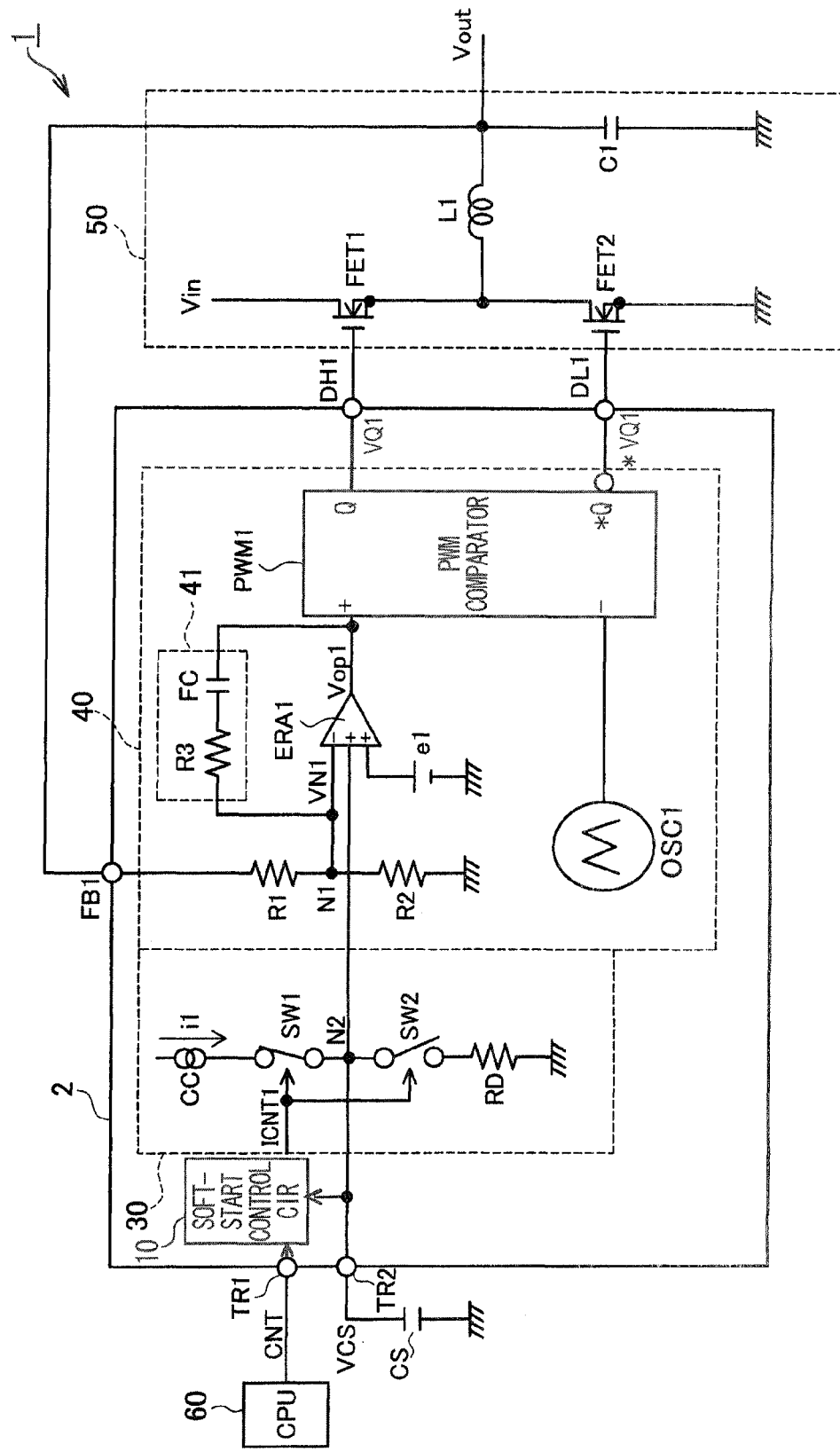
FIG. 4 shows a DC-DC converter according to a second embodiment.

FIG. 4 shows a DC-DC converter 1 according to a second embodiment. The DC-DC converter 1 includes a DC-DC converter control circuit 2 and a power section 50. An input voltage Vin is supplied to the input terminal of a transistor FET1 which is a main switching element of the power section 50, and the input terminal of a choke coil L1 is connected to the output terminal of the transistor FET1. An output voltage Vout is output from the output terminal of the choke coil L1. An output terminal DH1 of the DC-DC converter control circuit 2 is connected to the control terminal of the transistor FET1. The input terminal of a transistor FET2 which is a synchronous rectification switching element is grounded, and its output terminal is connected to the input terminal of the choke coil L1. An output terminal DL1 of the DC-DC converter control circuit 2 is connected to the control terminal of the transistor FET2. A smoothing capacitor C1 is connected between the output terminal of the choke coil L1 and the ground.

The DC-DC converter control circuit 2 includes a soft-start control circuit 10, a charging/discharging control circuit 30, and a switching control circuit 40. An operation control signal CNT is input from a CPU 60 to an input terminal TR1 of the DC-DC converter control circuit 2. A capacitor CS, having one end grounded, is connected to an input terminal TR2 of the DC-DC converter control circuit 2, and an output voltage control signal VCS is input to the input terminal TR2.

The switching control circuit 40 will be described below. An input resistor R1 and a ground resistor R2 are connected via a node N1 between an input terminal FB1 and the ground. The node N1 is connected to the inverting input terminal of an error amplifier ERA1. A reference voltage e1 is input to a first non-inverting input terminal of the error amplifier ERA1 and the output voltage control signal VCS is input to a second non-inverting input terminal of the error amplifier ERA1. The reference voltage e1 is a predetermined voltage for determining a setting voltage Vset for the output voltage Vout. The error amplifier ERA1 amplifies the difference between a lower one of the reference voltage e1 and the output voltage control signal VCS and a divisional voltage VN1 which is input to the inverting input terminal. A phase compensation circuit 41 includes a series connection of a resistor R3 and a capacitor FC. One end of the resistor R3 is connected to the node N1 and one end of the capacitor FC is connected to the output terminal of the error amplifier ERA1. The output terminal of the error amplifier ERA1 is connected to the non-inverting input terminal of a PWM comparator PWM1. An output signal of a triangular wave oscillator OSC1 is input to the inverting input terminal of the PWM comparator PWM1.

An output signal VQ1 which is output from a non-inverting output terminal Q of the PWM comparator PWM1 is input to the output terminal DH1. An output signal *VQ1 which is output from an inverting output terminal *Q of the PWM comparator PWM1 is input to the output terminal DL1.

The charging/discharging control circuit 30 includes a constant current circuit CC, a resistor RD, and switches SW1 and SW2. The constant current circuit CC is connected to the capacitor CS via the switch SW1. One end of the resistor RD is grounded and the other end is connected to the switch SW2. The switches SW1 and SW2 are connected at a node N2. The switches SW1 and SW2 are closed complementarily according to an internal operation control signal ICNT1. The node N2 is connected to the input terminal TR2 and the soft-start control circuit 10.

Figure 5:
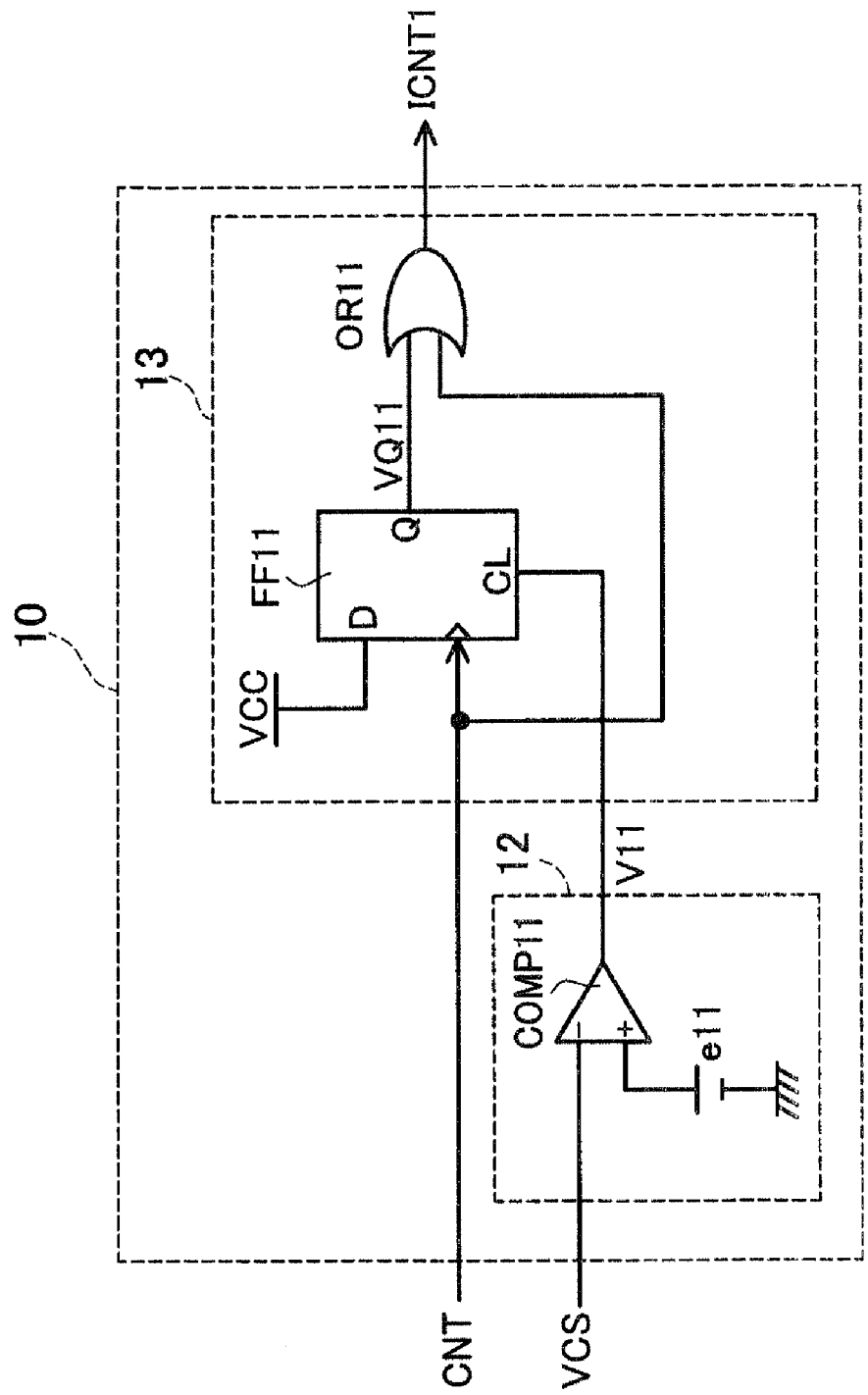
FIG. 5 shows a soft-start control circuit of the DC-DC converter of FIG. 4.

FIG. 5 shows the soft-start control circuit 10 according to the second embodiment. The operation control signal CNT and the output voltage control signal VCS are input to the soft-start control circuit 10 and the soft-start control circuit 10 outputs the internal operation control signal ICNT1. The soft-start control circuit 10 includes a detection circuit 12 and a latch circuit 13. The output voltage control signal VCS is input to the inverting input terminal of a comparator COMP11 of the detection circuit 12, and a reference voltage e11 is input to the non-inverting input terminal of the comparator COMP11. The reference voltage e11 is a predetermined voltage for determining the setting voltage Vset for the output voltage Vout. An output signal V11 is output from the detection circuit 12. The latch circuit 13 includes a flip-flop FF11 and an OR circuit OR11. The flip-flop FF11 is a D flip-flop which latches a data signal in response to a rising edge. The operation control signal CNT is input to the clock terminal of the flip-flop FF11, the output signal V11 of the detection circuit 12 is input to the clear terminal CL, and a power supply potential VCC is input to the data terminal D. An output signal VQ11 is output from the non-inverting output terminal Q of the flip-flop FF11. The output signal VQ11 and the operation control signal CNT are input to the OR circuit OR11, and the OR circuit OR11 outputs the internal operation control signal ICNT1.

Figure 6:
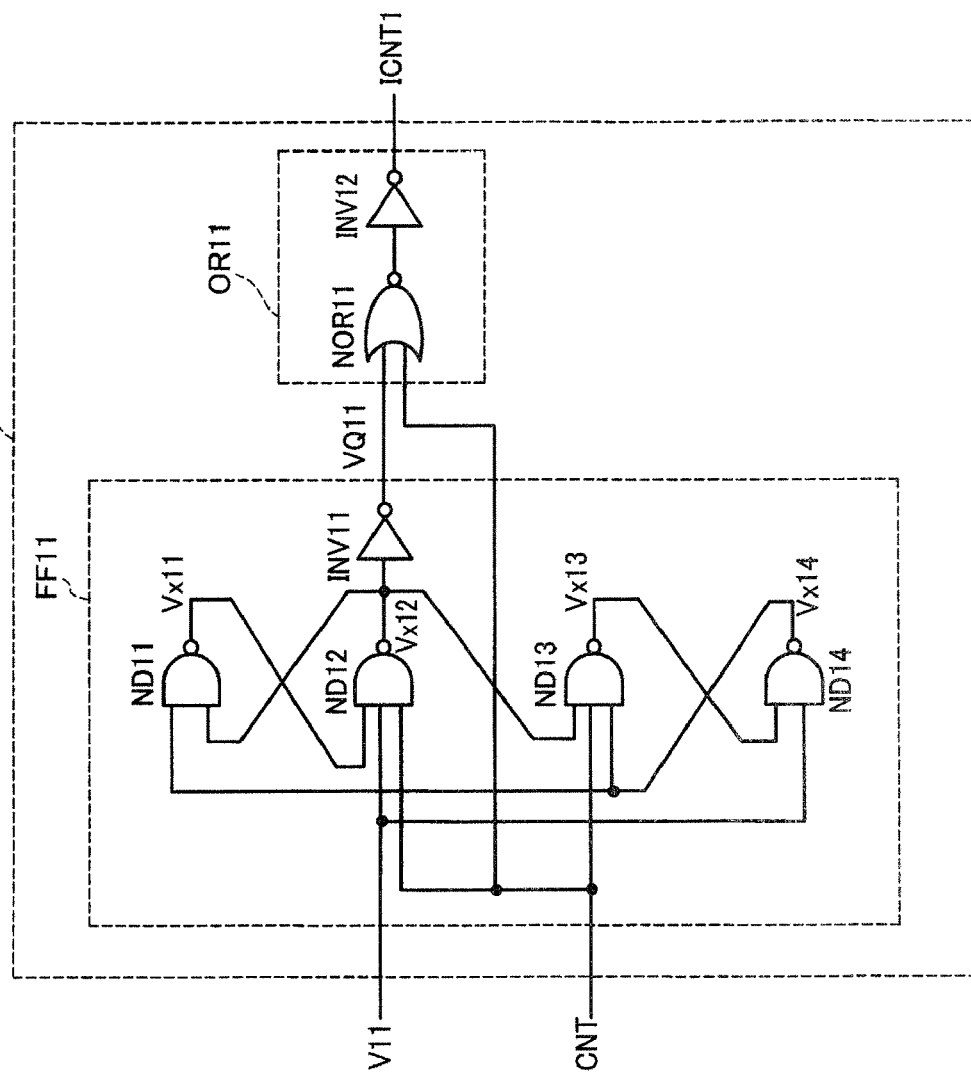
FIG. 6 shows a latch circuit of the soft-start control circuit of FIG. 5.

FIG. 6 shows the latch circuit 13. The latch circuit 13 includes the flip-flop FF11 and the OR circuit OR11. The flip-flop FF11 includes NAND circuits ND11-ND14 and an inverter circuit INV11. The NAND circuits ND11-ND14 output output signals Vx11-Vx14. The output signal V11 of the detection circuit 12, the operation control signal CNT, and the output signal Vx11 are input to the NAND circuit ND12. The output signals Vx12 and Vx14 and the operation control signal CNT are input to the NAND circuit ND13. The output signals Vx12 and Vx14 are input to the NAND circuit ND11. The output signal V11 of the detection circuit 12 and the output signal Vx13 are input to the NAND circuit ND14. The output signal Vx12 is input to the inverter circuit INV11, and the inverter circuit INV11 outputs the output signal VQ11. The OR circuit OR11 includes a NOR circuit NOR11 and an inverter circuit INV12. The output signal VQ11 and the operation control signal CNT are input to the NOR circuit NOR11. The output terminal of the NOR circuit NOR11 is connected to the input terminal of the inverter circuit INV12, and the inverter circuit INV12 outputs the internal operation control signal ICNT1.

Figure 7:
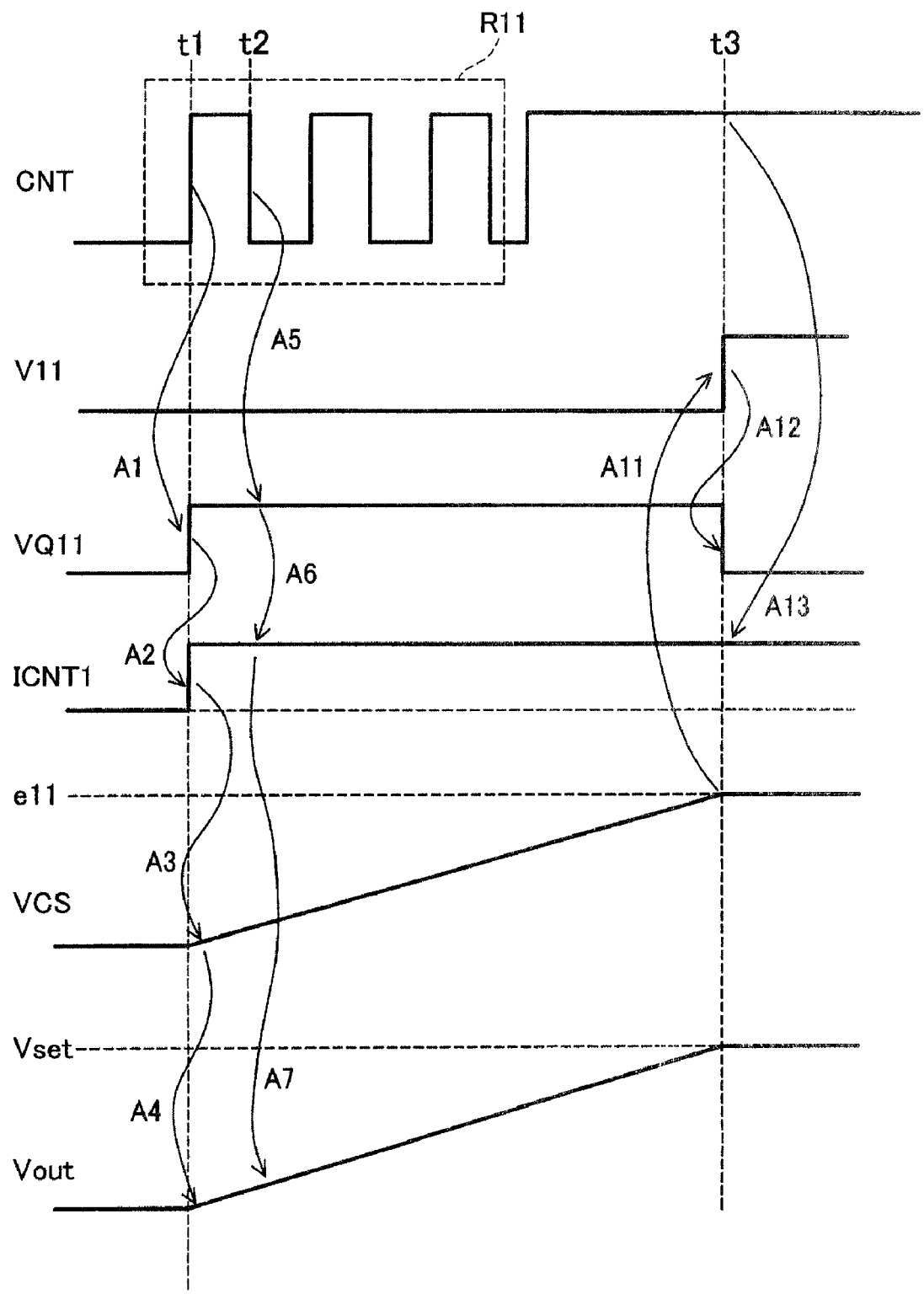
FIGS. 7 and 8 show timing charts of the DC-DC converter of FIG. 4.
Figure 8:
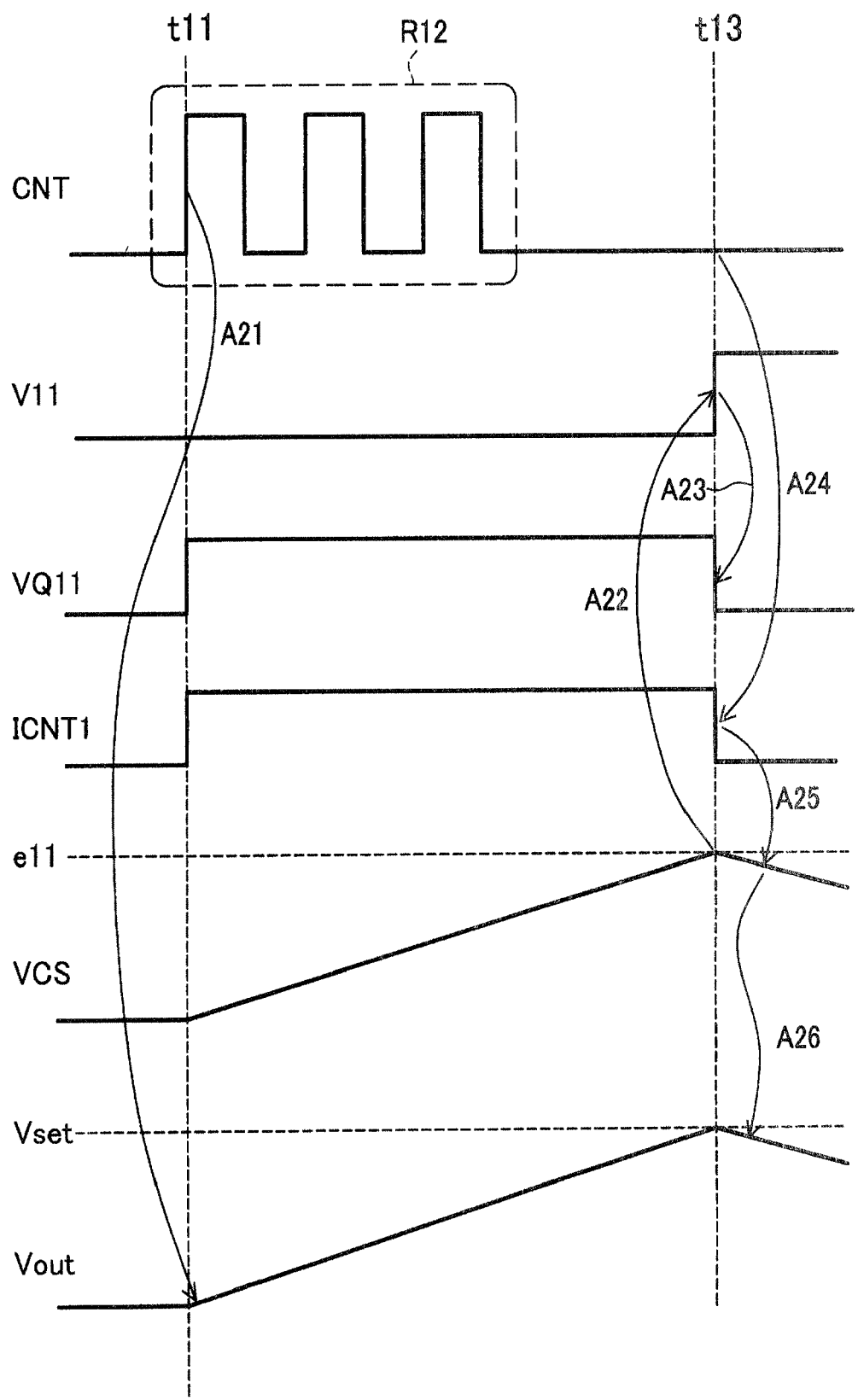

FIGS. 7 and 8 are timing charts of the DC-DC converter 1. The DC-DC converter control circuit 2 starts a soft-start operation of the DC-DC converter 1 in response to a high-level of the operation control signal CNT, which is an operation command. The DC-DC converter control circuit 2 stops operation of the DC-DC converter 1 in response to a low-level of the operation control signal CNT, which is a stop command. In activating the DC-DC converter 1 from a stop state, the DC-DC converter control circuit 2 performs a soft-start operation in which the output voltage Vout is increased gradually from 0 V to a predetermined setting voltage.

FIG. 7 shows how the DC-DC converter 1 operates when it is activated. Before time t1, the operation control signal CNT is at the low level, the output voltage Vout is 0 V, and the DC-DC converter 1 is in a stop state.

When the operation control signal CNT makes a transition from the low level to the high level at time t1, the DC-DC converter 1 is activated. At this time, chattering may occur in the operation control signal CNT. Chattering is a phenomenon identified by multiple transitions between the high level and the low level in a short period of time (region R11 in FIG. 7).

In response to the first rising edge of the operation control signal CNT, the flip-flop FF11 causes a transition of the output signal VQ11 from the low level to the high level (indicated by arrow A1). Because the internal operation control signal ICNT1 output from the OR circuit OR11 is kept at the high level based on the high-level output signal VQ11 irrespective of the level of the operation control signal CNT, the operation control signal CNT is masked (indicated by arrow A2).

In response to the high-level of the internal operation control signal ICNT1, the switch SW1 of the charging/discharging control circuit 30 is closed and the switch SW2 is opened. The capacitor CS is charged by a current i1 flowing through the constant current circuit CC, whereby the output voltage control signal VCS, which is output of the capacitor CS, is increased gradually from 0 V (indicated by arrow A3). At the time of the activation, the output voltage control signal VCS is lower than the reference voltage e1. AS a result, the error amplifier ERA1 amplifies the difference between the output voltage control signal VCS and the divisional voltage VN1.

The PWM comparator PWM1 compares the output signal Vop1 of the error amplifier ERA1 with the output voltage of the triangular wave oscillator OSC1, and outputs a high-level of the output signal VQ1 when the output signal Vop1 is higher than the output voltage of the triangular wave oscillator OSC1. The PWM comparator PWM1 operates as an output voltage pulse width converter which outputs a pulse whose width depends on the magnitude of the output signal Vop1. While the output signal VQ1 is at the high level, the transistor FET1 is on and the transistor FET2 is off. On the other hand, while the output signal VQ1 is at the low level, the transistor FET1 is off and the transistor FET2 is on. While the transistor FET1 is on, a current flows from the source of the input voltage Vin to the load via the choke coil L1, whereby energy is stored in the choke coil L1. While the transistor FET1 is off, that is, the transistor FET2 is on, the energy stored in the choke coil L1 is released. The output voltage Vout increases as the output voltage control signal VCS becomes higher (indicated by arrow A4). The DC-DC converter control circuit 2 starts a soft-start operation in response to the first rising edge of the operation control signal CNT.

At time t2, the operation control signal CNT makes a transition to the low level due to chattering. Since the flip-flop FF11 does not respond to a trailing edge, its output signal VQ11 is kept at the high level (indicated by arrow A5). According to the high-level output signal VQ11, the OR circuit OR11 keeps the internal operation control signal ICNT1 at the high level (indicated by arrow A6). Since the low-level operation control signal CNT is masked by the soft-start control circuit 10, the output voltage Vout continues increasing (indicated by arrow A7).

When the output voltage control signal VCS reaches the reference voltage e11 at time t3, the output signal V11 of the detection circuit 12 is inverted to the high level (indicated by arrow A11). That is, the detection circuit 12 detects that the output voltage Vout has increased to the setting voltage Vset and the soft-start operation has completed. After time t3, the reference voltage e1 is lower than the output voltage control signal VCS, and hence, the error amplifier ERA1 amplifies the difference between the reference voltage e1 and the divisional voltage VN1. The output voltage Vout is regulated at the setting voltage Vset.

In response to the input of a high-level of the output signal V11 to the clear terminal CL, the flip-flop FF11 causes a transition of the output signal VQ11 from the high level to the low level (indicated by arrow A12). Thus, the masking operation on the operation control signal CNT by the OR circuit OR11 is released, and the soft-start control circuit 10 performs an operation of passing a low-level of the operation control signal CNT. As shown in FIG. 7, after time t3, the operation control signal CNT is kept at the high level. The internal operation control signal ICNT1 is kept at the high level (indicated by arrow A13) and the DC-DC converter 1 is kept operational.

FIG. 8 shows how the DC-DC converter 1 operates when noise occurs in the operation control signal CNT. FIG. 8 shows a case when noise, which includes plural rising edges for a short time (region R12 in FIG. 8), occurs in the operation control signal CNT. The DC-DC converter control circuit 2 starts a soft-start operation in response to the first rising edge of the operation control signal CNT, and the output voltage Vout increases gradually as the output voltage control signal VCS becomes higher (indicated by arrow A21). Until time t13, a low-level of the operation control signal CNT is masked by the soft-start control circuit 10 and the output voltage Vout is kept increasing.

When the output voltage control signal VCS reaches the reference voltage e11 at time t13, the detection circuit 12 detects completion of the soft-start operation (indicated by arrow A22) by detecting that the output signal V11 is inverted to the high level. In response to the input of the high-level of the output signal V11 to the clear terminal CL, the flip-flop FF11 causes a transition of the output signal VQ11 from the high level to the low level (indicated by arrow A23). The masking operation on the operation control signal CNT by the OR circuit OR11 is canceled, and the soft-start control circuit 10 performs an operation of passing a low-level of the operation control signal CNT.

In the example of FIG. 8, since the operation control signal CNT is at the low level at time t13, the internal operation control signal ICNT1 makes a transition to the low level (indicated by arrow A24). In response to the low-level of the internal operation control signal ICNT1, the switch SW1 of the charging/discharging control circuit 30 is opened and the switch SW2 of the charging/discharging control circuit 30 is closed. Therefore, the capacitor CS is discharged via the resistor RD. As a result, the output voltage control signal VCS decreases and the output voltage Vout decreases (indicated by arrows A25 and S26).

The soft-start control circuit 10 disregards a low-level of the operation control signal CNT which is the stop command during the period from t11 when the soft-start operation is started to time t13 when the soft-start operation is completed. After the completion of the soft-start operation, a low-level of the operation control signal CNT is not disregarded, and hence, the operation of the DC-DC converter 1 is stopped in response to the low-level of the operation control signal CNT.

As described above, in the DC-DC converter 1 according to the second embodiment, the soft-start control circuit 10 prevents influence of chattering in the operation control signal CNT during a period from the start to the end of a soft-start operation. Since the soft-start control circuit 10 disregards a low-level of the operation control signal CNT, which is the stop command, during the period from the start to the end of the soft-start operation, influence of chattering can be prevented irrespective of various parameters, such as a duration and a pulse width of the chattering. The second embodiment makes it unnecessary to determine various circuit constants of the chattering elimination circuit in advance so that they are most suitable according to chattering parameters. The second embodiment also makes it possible to reduce or eliminate chattering though the various chattering parameters.

Figure 9:
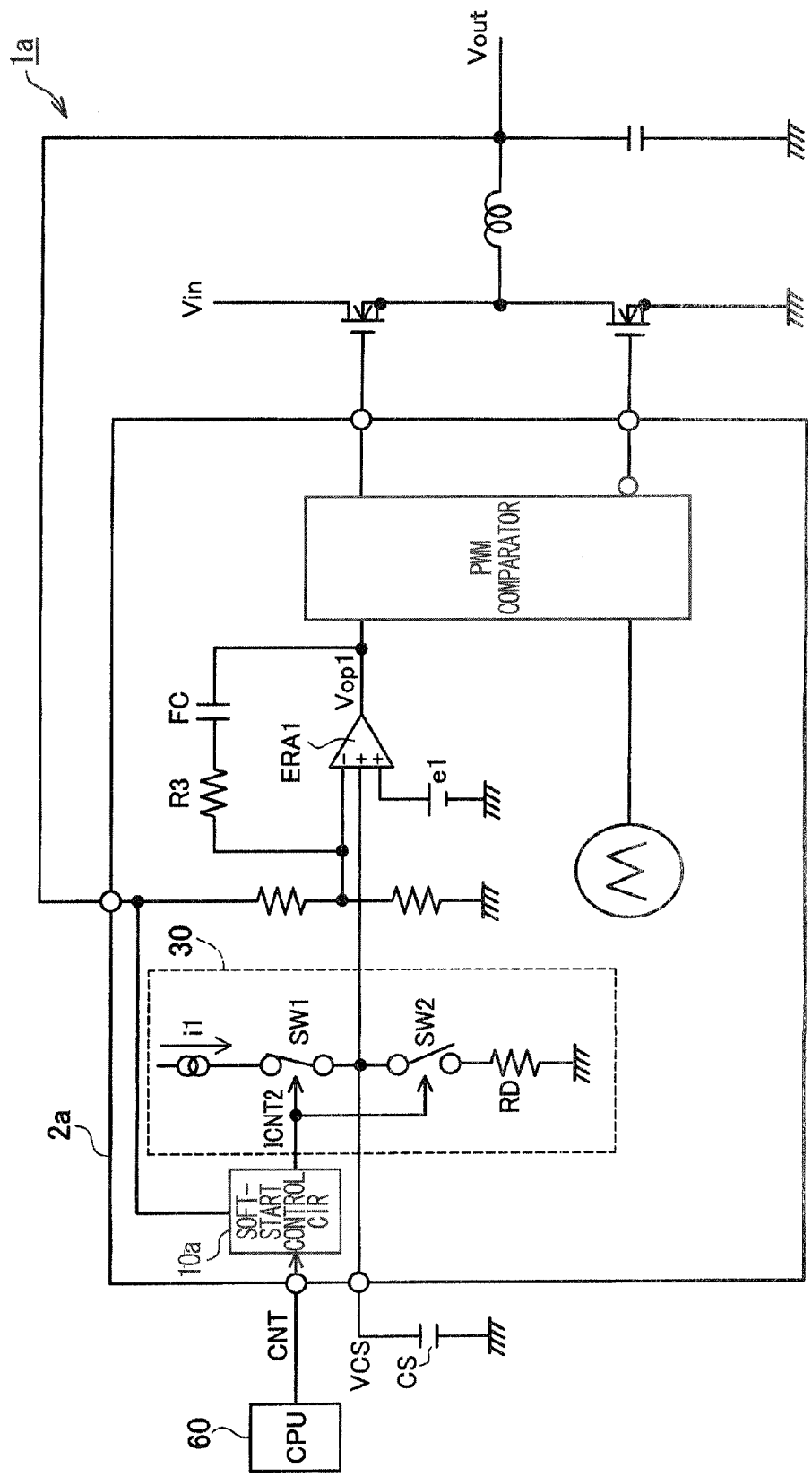
FIG. 9 shows a DC-DC converter according to a third embodiment.

FIG. 9 shows a DC-DC converter 1a according to a third embodiment. A DC-DC converter control circuit 2a includes a soft-start control circuit 10a instead of the soft-start control circuit 10 of the second embodiment. An operation control signal CNT which is output from a CPU 60 and an output voltage Vout are input to the soft-start control circuit 10a. An internal operation control signal ICNT2 which is output from the soft-start control circuit 10a is input to the charging/discharging control circuit 30. The other part of the configuration of the DC-DC converter 1a is the same as that of the DC-DC converter 1 of FIG. 4, and hence, will not be described in detail.

Figure 10:
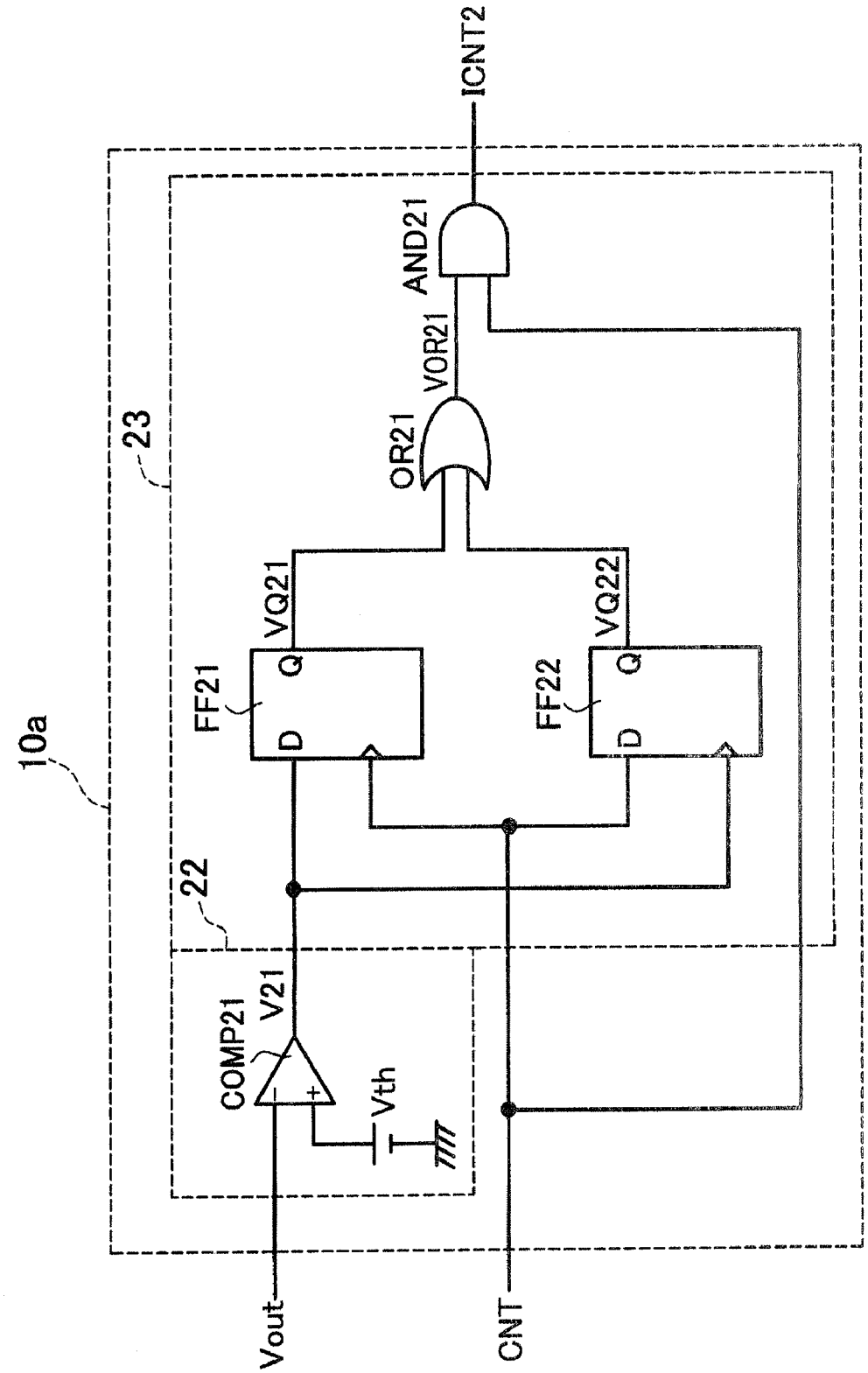
FIG. 10 shows a soft-start control circuit of the DC-DC converter of FIG. 9.

FIG. 10 shows the soft-start control circuit 10a. The soft-start control circuit 10a includes a detection circuit 22 and a latch circuit 23. The output voltage Vout is input to the inverting input terminal of a comparator COMP21 of the detection circuit 22 and a threshold voltage Vth is input to its non-inverting input terminal. The threshold voltage Vth is a voltage to be used for judging whether or not the DC-DC converter 1a is in a stop state. If the output voltage Vout is higher than the threshold voltage Vth, the DC-DC converter 1a is judged to be in an operation state. If the output voltage Vout is lower than the threshold voltage Vth, the DC-DC converter 1a is judged to be in a stop state. An output signal V21 is output from the detection circuit 22.

The latch circuit 23 includes flip-flops FF21 and FF22, an OR circuit OR21, and an AND circuit AND21. Each of the flip-flops FF21 and FF22 is a D flip-flop which latches a data signal in response to a rising edge. The operation control signal CNT is input to the clock terminal of the flip-flop FF21, and the output signal V21 of the detection circuit 22 is input to the data terminal D of the flip-flop FF21. An output signal VQ21 is output from the non-inverting output terminal Q of the flip-flop FF21. The output signal V21 of the detection circuit 22 is input to the clock terminal of the flip-flop FF22, and the operation control signal CNT is input to the data terminal D of the flip-flop FF22. An output signal VQ22 is output from the non-inverting output terminal Q of the flip-flop FF22. The output signals VQ21 and VQ22 are input to the OR circuit OR11, and an output signal VOR21 is output from the OR circuit OR11. The output signal VOR21 and the operation control signal CNT are input to the AND circuit AND21, and the AND circuit AND21 outputs an internal operation control signal ICNT2.

Figure 11:
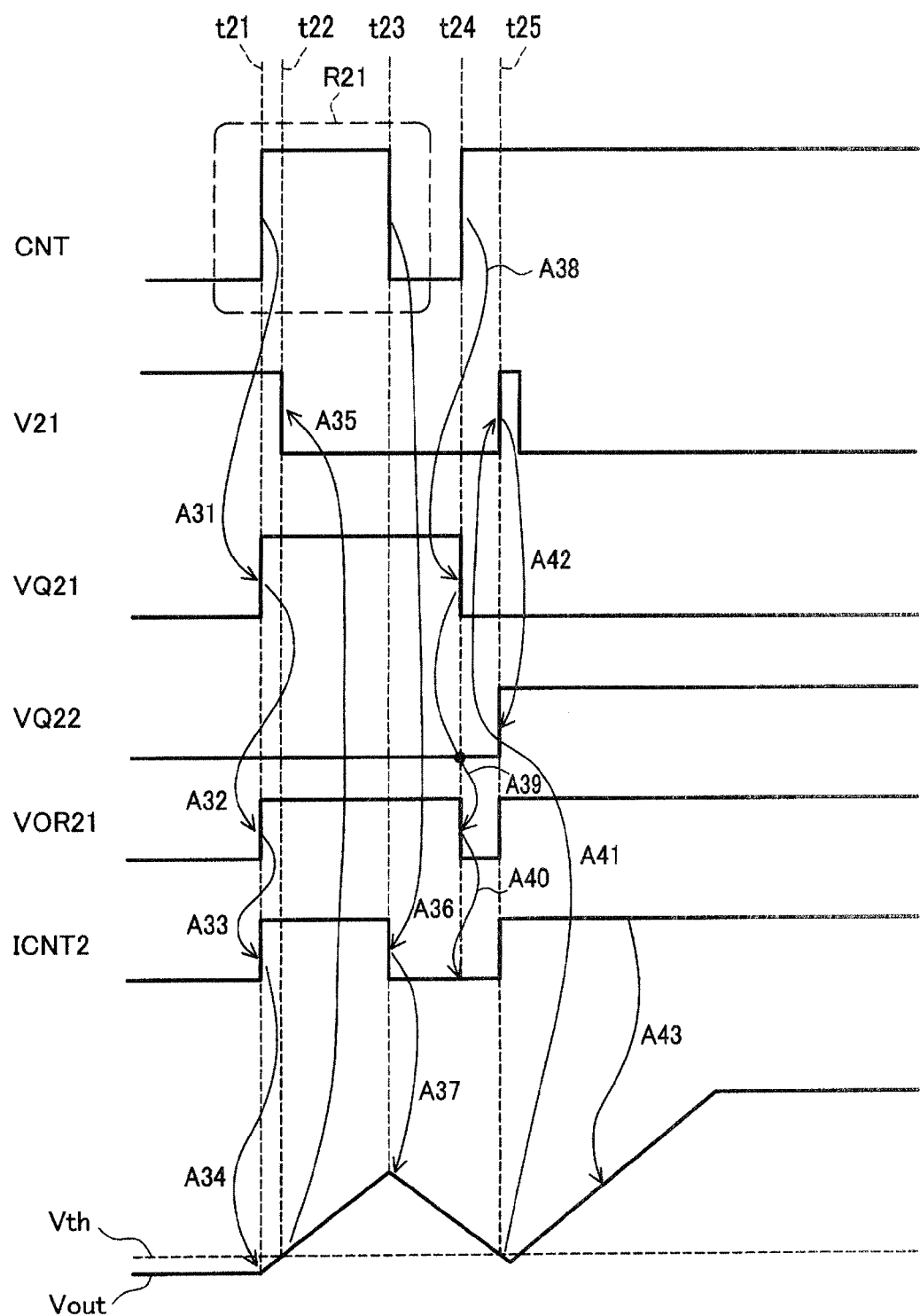
FIG. 11 shows a timing chart of the DC-DC converter of FIG. 9.

FIG. 11 shows how the DC-DC converter 1a operates when it is activated. Before time t21, the operation control signal CNT is at the low level, the output voltage Vout is 0 V, and the DC-DC converter 1a is in a stop state. The operation control signal CNT makes a transition from the low level to the high level at time t21, whereby the DC-DC converter 1a is activated. At this time, chattering may occur in the operation control signal CNT (region R21).

The flip-flop FF21 outputs a high-level of the output signal VQ21 when it receives a rising edge of the operation control signal CNT, which is the operation command, and the DC-DC converter 1a is in a stop state. In response to the first rising edge of the operation control signal CNT, the flip-flop FF21 latches a high-level output signal V21 (indicated by arrow A31). According to a high-level output signal VQ21, the output signal VOR21, which is output from the OR circuit OR21, is fixed to the high level (indicated by arrow A32). Since the high-level of the operation control signal CNT and the high-level of the output signal VOR21 are input to the AND circuit AND21, the internal operation control signal ICNT2, which is output from the AND circuit AND21, makes a transition to the high level (indicated by arrow A33). According to the high-level of the internal operation control signal ICNT2, the charging/discharging control circuit 30 causes the capacitor CS to be charged by a current i1, whereby the output voltage control signal VCS is increased gradually from 0 V. Therefore, the output voltage Vout increases as the output voltage control signal VCS becomes higher (indicated by arrow A34). The DC-DC converter control circuit 2a starts a soft-start operation in response to the first rising edge of the operation control signal CNT.

When the output voltage Vout has increased and reaches the threshold voltage Vth at time t22, the detection circuit 22 detects that the DC-DC converter 1a transitions out of the stop state and the output signal V21 of the detection circuit 22 is inverted to the low level (indicated by arrow A35).

The AND circuit AND21 comes to pass a low-level of the operation control signal CNT. If the operation control signal CNT makes a transition to the low level at time t23 due to chattering, the internal operation control signal ICNT2 which is output from the AND circuit AND21 makes a transition to the low level (indicated by arrow A36). According to the low-level of the internal operation control signal ICNT2, the capacitor CS is discharged by the charging/discharging control circuit 30. Therefore, the output voltage control signal VCS decreases and the output voltage Vout decreases (indicated by arrow A37).

At time t24, the operation control signal CNT makes a transition to the high level due to the chattering. The flip-flop FF21 latches the low-level of the output signal V21 in response to a rising edge of the operation control signal CNT (indicated by arrow A38). Since low-level output signals VQ21 and VQ22 are input to the OR circuit OR21, the output signal VOR21 makes a transition to the low level (indicated by arrow A39). Since the low-level of the output signal VOR21 is input to the AND circuit AND21, the internal operation control signal ICNT2 is kept at the low level (indicated by arrow A40). Since a high-level of the operation control signal CNT is masked by the AND circuit AND21, the output voltage Vout continues to decrease.

When the output voltage Vout has decreased and reaches the threshold voltage Vth at time t25, the detection circuit 22 detects that the DC-DC converter 1a is in a stop state again and its output signal V21 of the detection circuit 22 is inverted to the high level (indicated by arrow A41). The flip-flop FF22 outputs a high-level output signal VQ22 when it receives a rising edge of the operation control signal CNT, which is the operation command, and the DC-DC converter 1a is in a stop state. In response to the rising edge of the output signal V21, the flip-flop FF22 latches a high-level of the operation control signal CNT and makes the output signal VQ22 the high level (indicated by arrow A42). According to the high-level of the output signal VQ22, the output signal VOR21, which is output from the OR circuit OR21, is fixed to the high level. In this manner, the operation of masking a high-level operation control signal CNT by the AND circuit AND21 is canceled.

Since the high-level operation control signal CNT and the high-level output signal VOR21 are input to the AND circuit AND21, the internal operation control signal ICNT2 makes a transition to the high level and the output signal Vout increases (indicated by arrow A43). That is, the DC-DC converter control circuit 2a starts a soft-start operation again in response to the rising edge of the operation control signal CNT which occurs after the completion of the stop operation of the DC-DC converter 1a.

The soft-start control circuit 10a disregards a high-level operation control signal CNT, which is the operation command, during the period from t23, when the stop operation of the DC-DC converter 1a is started, to time t24, when the stop operation is completed. After the completion of the stop operation of the DC-DC converter 1a, the soft-start control circuit 10a does not disregard a high-level operation control signal CNT. Therefore, at time t25, the soft-start control circuit 10a starts a soft-start operation of the DC-DC converter 1a in response to the high-level operation control signal CNT.

As described above, in the DC-DC converter 1a according to the third embodiment, the soft-start control circuit 10a prevents influence of chattering in the operation control signal CNT during a period from the start to the end of a stop operation of the DC-DC converter 1a. Since the soft-start control circuit 10a disregards a high-level operation control signal CNT, which is the operation command, during the period from the start to the end of the stop operation, influence of chattering can be prevented irrespective of various parameters such as a duration and a pulse width of the chattering. It is not necessary to determine various circuit constants of the chattering elimination circuit in advance so that they are most suitable according to chattering parameters. Therefore, chattering can be reduced or eliminated though the various chattering parameters.

If influence of chattering is not prevented during a period from the start to the end of a stop operation, in this period, operation commands are executed repeatedly in a short time and the output voltage control signal VCS is increased repeatedly. Since the error amplifier ERA1 increases the output signal Vop1 according to the difference between the output voltage control signal VCS and the output voltage Vout, the output signal Vop1 increases repeatedly as the output voltage control signal VCS increases repeatedly. Since the capacitor FC is charged repeatedly by the output signal Vop1, a sufficiently long discharge time may not be obtained. In such a case, the output signal Vop1 is kept high by the charge stored in the capacitor FC, and the PWM comparator PWM1 operates at a maximum on-duty cycle. As a result, the output voltage Vout increases even though the stop commands are executed, and the DC-DC converter 1a may become uncontrollable. In actuality, the DC-DC converter control circuit 2a disregards the operation commands in the operation control signal CNT during the period from the start to the end of the stop operation of the DC-DC converter 1a. Therefore, the capacitor FC is given a sufficiently long discharge time, thus preventing the DC-DC converter 1a from becoming uncontrollable.

The invention is not limited to the disclosed embodiments, and various improvements and modifications are possible without departing from the spirit and scope of the invention. The point of the soft-start control circuit is to detect the feedback output voltage Vout of the DC-DC converter in a prescribed period and to disregard an operation command or a stop command in this period. Therefore, the output voltage Vout may directly be fed back to the soft-start control circuit.

Alternatively, the output voltage control signal VCS which determines the output voltage Vout may be fed back to the soft-start control circuit. In the DC-DC converter control circuit 2 according to the second embodiment, the output voltage control signal VCS is fed back to the soft-start control circuit 10. Alternatively, the output voltage Vout may be fed back. In the DC-DC converter control circuit 2a according to the third embodiment, the output voltage Vout is fed back to the soft-start control circuit 10a. Alternatively, the output voltage control signal VCS may be fed back.

The soft-start control circuit 10 according to the second embodiment disregards a low-level of the operation control signal CNT during a period from the start to the end of a soft-start operation of the DC-DC converter 1. The soft-start control circuit 10a according to the third embodiment disregards a high-level of the operation control signal CNT during a period from the start to the end of a stop operation of the DC-DC converter 1a. However, the soft-start control circuit 10 and the soft-start control circuit 10a perform chattering-preventive operations during different periods, such as an activation period and a stop period of the DC-DC converter, respectively. Therefore, the DC-DC converter may include both of the functions of the soft-start control circuit 10 and the soft-start control circuit 10a.

Each of the DC-DC converter control circuits 2 and 2a may be formed by a single or plural semiconductor chips, or the like. The transistors FET1 and FET2 may be independent, discrete power elements. The transistors FET1 and FET2 may be incorporated as an LSI in the DC-DC converter control circuit 2 or 2a. Each of the DC-DC converters 1 and 1a may be formed by a single or plural semiconductor chips or may have a module configuration. Each of the DC-DC converters 1 and 1a can be applied to various power supply devices.

The embodiments are directed to the voltage-mode DC-DC converters. The point is to monitor the output voltage of the DC-DC converter in a prescribed period and to disregard an operation command or a stop command in this period. Therefore, the embodiments can be applied to not only voltage-mode DC-DC converters but also current-mode converters.

For purposes of explanation, in the above description, numerous specific details are set forth in order to provide a thorough understanding of the DC-DC converter. It will be apparent, however, to one skilled in the art that the DC-DC converter can be practiced without these specific details. In other instances, well-known structures and devices are shown in block diagram form in order to avoid obscuring the DC-DC converter.

While the DC-DC converter has been described in conjunction with the specific embodiments thereof, it is evident that many alternatives, modifications, and variations will be apparent to those skilled in the art. Accordingly, embodiments of the DC-DC converter as set forth herein are intended to be illustrative, not limiting. There are changes that may be made without departing from the spirit and scope of the invention.

What is claimed is:

1. A DC-DC converter including a soft-start function of a soft start in response to a soft-start signal, comprising:
    a detection circuit of a soft-start control circuit configured to detect whether the soft start signal is active at an end of a soft-start operation; and
    an output voltage control circuit, configured to be responsive to the detection circuit for controlling an output voltage based on detection result of the detection circuit.

2. The DC-DC converter according to claim 1, wherein the output voltage control circuit maintains the output voltage when the detection result indicates that the soft-start signal is active, and decreases the output voltage when the detection result indicates that the soft-start signal is inactive.

3. The DC-DC converter according to claim 1, wherein a completion of a soft-start operation is determined based on whether the output voltage reaches a terminal voltage set according to the soft-start function.

4. The DC-DC converter according to claim 1, further comprising:
an error amplifier that includes an input portion for receiving a soft-start-related signal, wherein the error amplifier amplifies a difference between the output voltage and a reference voltage; and
a PWM control circuit that controls a first switching transistor and a second switching transistor based on the output of the error amplifier.

5. A DC-DC converter comprising:
an input circuit that receives an external soft-start signal;
a soft-start conversion circuit that converts the external soft-start signal into an internal soft-start signal; and
a soft-start starting circuit that starts a soft-start operation in response to an activation of the internal soft-start signal, wherein the soft-start conversion circuit includes:
a detection circuit of the soft-start control circuit configured to detect whether-the soft-start signal is active at an end of a soft-start operation; and
an output voltage control circuit configured to be responsive to the detection circuit of the soft-start control circuit that controls an output voltage based on a detection result of the detection circuit.

6. The DC-DC converter according to claim 5, wherein the soft-start conversion circuit makes the internal soft-start signal inactive when the detection result indicates that the external soft-start signal is inactive.

7. The DC-DC converter according to claim 5, wherein a completion of a soft-start operation is determined based on whether the output voltage reaches a terminal voltage set according to the soft-start function.

8. The DC-DC converter according to claim 5, further comprising:
an error amplifier that includes an input portion for receiving a soft-start-related signal, wherein the error amplifier amplifies a difference between the output voltage and a reference voltage; and
a PWM control circuit that controls a first switching transistor and a second switching transistor based on the output of the error amplifier.

9. A power supply voltage supplying method comprising:
receiving a soft-start signal at an input of a soft-start control circuit from a CPU;
starting a soft-start operation in response to an activation of the soft-start signal received at said input;
detecting at a detection circuit of the soft-start control circuit whether the soft-start signal is active at an end of the soft-start operation; and
controlling an output voltage based on a detection result of the detection circuit.

10. The power supply voltage supplying method according to claim 9, further comprising:
maintaining the output voltage when the detection result indicates that the soft-start signal is active; and
decreasing the output voltage when the detection result indicates that the soft-start signal is inactive.

11. A power supply voltage supplying system comprising:
a CPU; and
a DC-DC converter that performs a soft-start operation based on a soft-start signal supplied from the CPU, the DC-DC converter including:
a detection circuit of a soft-start control circuit that detects whether the soft-start signal is active at an end of a soft-start operation; and
an output voltage control circuit responsive to the detection circuit of the soft-start control circuit that controls an output voltage based on a detection result of the detection circuit.

12. The power supply voltage supplying system according to claim 11, wherein the output voltage control circuit maintains the output voltage when the detection result indicates that the soft-start signal is active, and decreases the output voltage when the detection result indicates that the soft-start signal is inactive.

13. A DC-DC converter including a soft-start function in response to a soft-start signal, comprising:
a detection circuit of a soft-start control circuit configured to detect whether the soft start signal is active at an end of the a soft-start operation; and
a circuit that detects an output voltage in response to an activation of the soft-start signal when the detection circuit detects that the soft start signal is active, and starts a soft-start operation when the output voltage falls within a prescribed range including a ground potential.

14. The DC-DC converter according to claim 13, further comprising:
an error amplifier that includes an input portion for receiving a soft-start-related signal, wherein the error amplifier amplifies a difference between the output voltage and a reference voltage; and
a PWM control circuit that controls a first switching transistor and a second switching transistor based on the output of the error amplifier.

15. The DC-DC converter according to claim 13, further comprising:
a comparison circuit that compares the output voltage with a ground potential;
a first latch circuit that latches a comparison result of the comparison circuit in response to the soft-start signal;
a second latch circuit that latches the soft-start signal in response to the comparison result; and
a logical operation circuit that performs a logical operation of outputs of the first circuit and the second latch circuit.

16. A DC-DC converter comprising:
an input circuit that receives an external soft start signal,
a soft-start conversion circuit configured to convert the external soft-start signal into an internal soft-start signal;
a soft-start starting circuit configured to start a soft-start operation in response to activation of the internal soft-start signal; and
a circuit of the soft-start starting circuit configured to detect an output voltage in response to activation of the soft-start signal and starts a soft-start operation when the output voltage falls within a prescribed range including a ground potential.

17. The DC-DC converter according to claim 16, wherein the soft-start conversion circuit includes:
a comparison circuit that compares the output voltage with the ground potential;
a first latch circuit that latches the comparison result in response to the soft-start signal;
a second latch circuit that latches the soft-start signal in response to the comparison result; and
a logical operation circuit that performs a logical operation on outputs of the first circuit and the second latch circuit.

18. A power supply voltage supplying method for starting supply of a power supply voltage by starting a soft start based on a soft-start signal which is activated at a time of power-on or resetting, comprising:
- receiving the soft-start signal at an input to a soft-start circuit from a CPU;
- detecting an output voltage at an input to the soft-start circuit in response to an activation of the soft-start signal; and
- starting a soft-start operation when the output voltage falls within a prescribed range including a ground potential.

19. A power supply voltage supplying system comprising:
a CPU; and
a DC-DC converter that performs a soft-start operation based on a soft-start signal supplied from the CPU, the DC-DC converter including:
- a circuit of a soft-start control circuit configured to defect an output voltage in response to activation of the soft-start signal input to the soft-start control circuit and to start a soft-start operation when the output voltage falls within a prescribed range including a ground potential.

20. The power supply voltage supplying system according to claim 19, wherein the DC-DC converter further comprises:
- an error amplifier that includes an input portion for receiving a soft-start-related signal, wherein the error amplifier amplifies a difference between the output voltage and a reference voltage; and
- a PWM control circuit that controls the first switching transistor and the second switching transistor based on the output of the error amplifier.

* * * * *